(12) United States Patent
Goto et al.

(10) Patent No.: US 6,304,008 B1
(45) Date of Patent: Oct. 16, 2001

(54) ELECTRONIC DEVICE HAVING AUTO-OFF OR AUTO-ON/OFF FUNCTION

(75) Inventors: Yoshimi Goto; Toshiharu Mori; Yoshio Tanabe, all of Miyagi-ken; Kaoru Soeta, Kanagawa-ken, all of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/437,975

(22) Filed: Nov. 10, 1999

(30) Foreign Application Priority Data

Nov. 12, 1998 (JP) .................................................. 10-322326

(51) Int. Cl.$^7$ .................................................. H01H 47/00
(52) U.S. Cl. .......................... 307/125; 307/139; 307/140
(58) Field of Search ..................................... 307/125, 139, 307/140; 335/14, 20; 361/115, 71, 72, 152; 200/523, 524

(56) References Cited

U.S. PATENT DOCUMENTS 4,436,408 * 3/1984 Inuzuka et al. ..................... 355/14 R
5,041,805 * 8/1991 Ohishi et al. .......................... 335/14

FOREIGN PATENT DOCUMENTS

Hei 6-349139    12/1994 (JP) .

* cited by examiner

*Primary Examiner*—Fritz Fleming
*Assistant Examiner*—Robert L. Deberadinis
(74) *Attorney, Agent, or Firm*—Brinks Hofer Gilson & Lione

(57) ABSTRACT

An electronic device having an auto-OFF function is disclosed in which a switch unit having an auto-OFF function and capable of being operated manually and automatically is connected to a primary circuit in a power control circuit, the switch unit S1 being normally turned auto-OFF with a signal provided from a control system circuit to cut off the supply of electric power to the primary circuit, thereby permitting a stand-by electric power to be nil, and if a trouble should occur in the control system circuit to an inoperable extent of the switch, the switch can be turned OFF manually.

7 Claims, 6 Drawing Sheets

ELECTRONIC DEVICE HAVING AUTO-OFF OR AUTO-ON/OFF FUNCTION

BACKGROUND OF THE INVENTION

1. Field of the Invention

The present invention relates to an electronic device and more particularly to an electronic device capable of decreasing the power consumption (stand-by power) while not in operation (not in use).

2. Description of the Prior Art

Conventional electronic devices will now be described by way of VTRs for example. Most of VTRs have a timer recording function, and usually because of the necessity of performing the timer recording, a primary power supply circuit is kept ON and part of a secondary power supply circuit remains connected thereto, even in the state of power OFF (including a timer recording stand-by state).

Therefore, even with the second power supply circuit OFF (including a timer recording stand-by state), electric power is supplied continually to the primary power supply circuit, that is, electric power continues to be consumed, which corresponds to a power consumption of several watts or so even while not in use (not in operation).

A power control system circuit in such a VTR, as shown in FIG. 9 which is a circuit diagram of principal portions, substantially comprises a primary power supply circuit 1 to which AC 100V is fed through a terminal 1a, a power transformer 2, a signal and motor system power circuit 3 and a control system power circuit 4 both serving as secondary power supply circuits, a signal and motor system circuit 6, a control system circuit 7 constituted of a microcomputer, a power control transistor 8, a resistor 9, a switching transistor 10, and an ON/OFF switch 11 which provides a switching signal between start-up state and stand-by state.

When electric power is fed to the power control system circuit and the power supply of the electronic device is ON, the switch 11 is turned OFF by an operator or a shift to a timer recording stand-by mode is instructed by an inputting operation, the control system circuit 7 detects this state and sends a signal to the power control transistor 8 to turn OFF the transistor, whereby the switching transistor 10 is turned OFF and the supply of electric power from the signal and motor system power circuit 3 to the signal and motor system circuit 6 is cut off, so that the electronic device is turned OFF.

In the conventional electronic device, even with power OFF, the signal and motor system power circuit 3 and the control system power circuit 4 both constituting the secondary power supply circuit are connected to the primary power supply circuit 1 to which AC 100V is inputted through the power transformer 2, thus giving rise to the problem that the consumption of power is continued as a stand-by power.

For solving this problem there has been proposed an electronic device in which a relay is connected to the primary power supply circuit 1, though not shown. In such an electronic device with a relay connected to the primary power supply circuit, the control system circuit 7, on detecting an ON/OFF operation of the switch 11, turns ON or OFF a relay driving transistor (not shown), thereby turning the relay ON or OFF, whereby the primary power supply circuit 1 can be turned ON or OFF.

In such a conventional electronic device, however, in the event a malfunction such as runaway should occur in the control system circuit 7 for some reason or other, it becomes impossible for the control system circuit 7 to detect the operation of the switch 11 even if the switch is operated ON or OFF and thus it becomes impossible to control the ON/OFF operation of the relay. If the primary power supply circuit 1 is ON in such a case, there is a fear that an excessive current may flow in the power control circuit.

Since the interior of the aforesaid relay is hermetically sealed, it has been impossible to operate the relay manually from the exterior. Therefore, in the event the control system circuit 7 should become uncontrollable as mentioned above, the user had no choice but to pull out the terminal 1a from the associated plug receptacle to stop the supply of electric power to the primary power supply circuit 1 in order to ensure safety.

At ordinary homes, however, an electronic device such as TV or VTR is in many cases disposed in close proximity to a wall of a room, and a plug receptacle for insertion therein of the terminal 1a is wired in the wall. For pulling out the terminal 1a from the plug receptacle it is necessary to move the electronic device disposed in close proximity to the wall, which movement is difficult for a powerless person.

SUMMARY OF THE INVENTION

It is an object of the present invention to solve the above-mentioned problems and provide a highly safe electronic device which can make the power consumption zero while the electronic device is not in use and in which, even in the event a malfunction such as runaway should occur in the control system circuit 7, the primary power supply circuit can be cut off directly without the need of pulling out the terminal 1a from the plug receptacle.

According to the first embodiment of the present invention for achieving the above-mentioned object there is provided an electronic device having an auto-OFF function and comprising a primary power supply circuit, a secondary power supply circuit which is supplied with electric power from the primary power supply circuit, a control system circuit connected to the secondary power supply circuit, and a switch unit having a switch and an operating member which can operate the switch ON and OFF manually and OFF automatically, the switch unit being connected to the primary power supply circuit and having a drive source which can operate the operating member automatically, thereby causing the switch to turn auto-OFF, wherein, in accordance with a signal provided from the control system circuit, the drive source is operated to turn the switch auto-OFF or the operating member is operated manually to turn the switch OFF, thus permitting the supply of electric power to the primary power supply circuit to be cut off automatically or manually.

According to a second embodiment of the present invention for achieving the above-mentioned object, in the switch unit, the switch is turned ON when the operating member is in a locked state and is turned OFF when the operating member is in an unlocked state, the operating member can be operated from locked to unlocked state automatically by operating the drive source, and the operating member can also be operated manually from locked to unlocked state.

According to the a third embodiment of the present invention for achieving the above-mentioned object there is provided an electronic device having an auto-ON/OFF function and comprising a primary power supply circuit, a secondary power supply circuit which is supplied with electric power from the primary power supply circuit, a control system circuit connected to the secondary power supply circuit, a switch unit having a switch and an operating member which can operate the switch ON and OFF manually and automatically, and an electric power storage means connected between the control system circuit and the switch device, the switch unit being disposed in the primary power supply circuit and having a drive source which can operate the operating member automatically, wherein the drive source is operated with a signal provided from the control system circuit or with electric power fed from the electric power storage means to turn the switch auto-ON and OFF, thus permitting the supply and cut-off of electric power for the primary power supply circuit to be done automatically, and the supply and cut-off of electric power for the primary power supply circuit can be done manually by manually operating the operating member to turn the switch ON and OFF.

According to a fourth embodiment of the present invention for achieving the foregoing object, the operating member in the switch unit can be operated to a locked state and an unlocked state automatically or manually, the switch is turned OFF when the operating member is in the locked state and is turned ON when the operating member is in the unlocked state, and for automatically opening the primary power supply circuit in an energized state, the drive source is operated with a signal provided from the control system circuit to operate the operating member automatically from unlocked to locked state, while for automatically closing the primary power supply circuit in a de-energized state, the drive source is operated by the supply of electric power thereto from the electric power storage means to operate the operating member from locked to unlocked state.

DETAILED DESCRIPTION OF PREFERRED EMBODIMENTS

Figure 1:
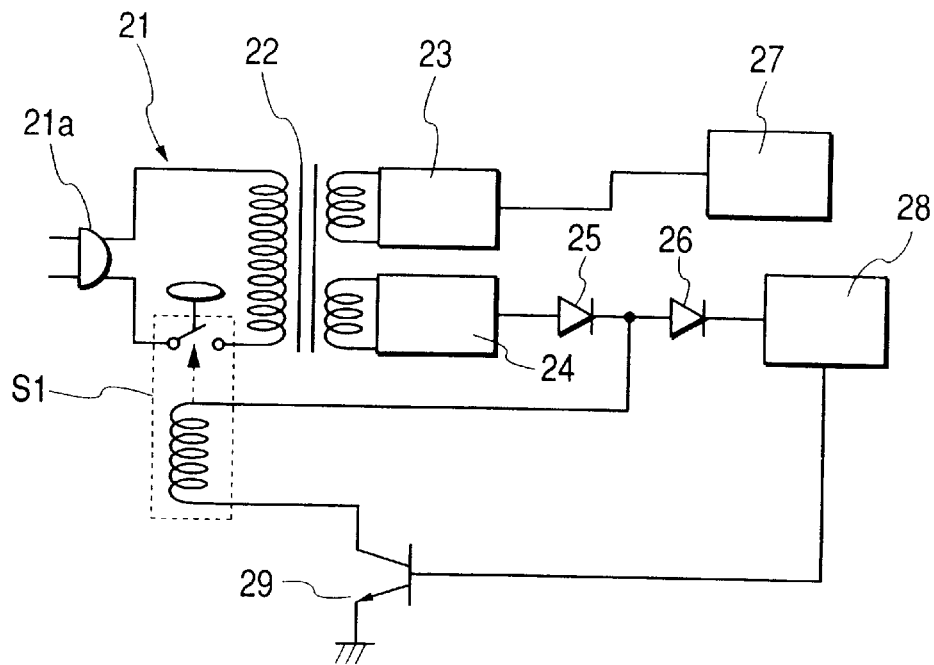
FIG. 1 is a circuit diagram of principal portions of a power control circuit used in an electronic device according to the present ;invention.
Figure 2:
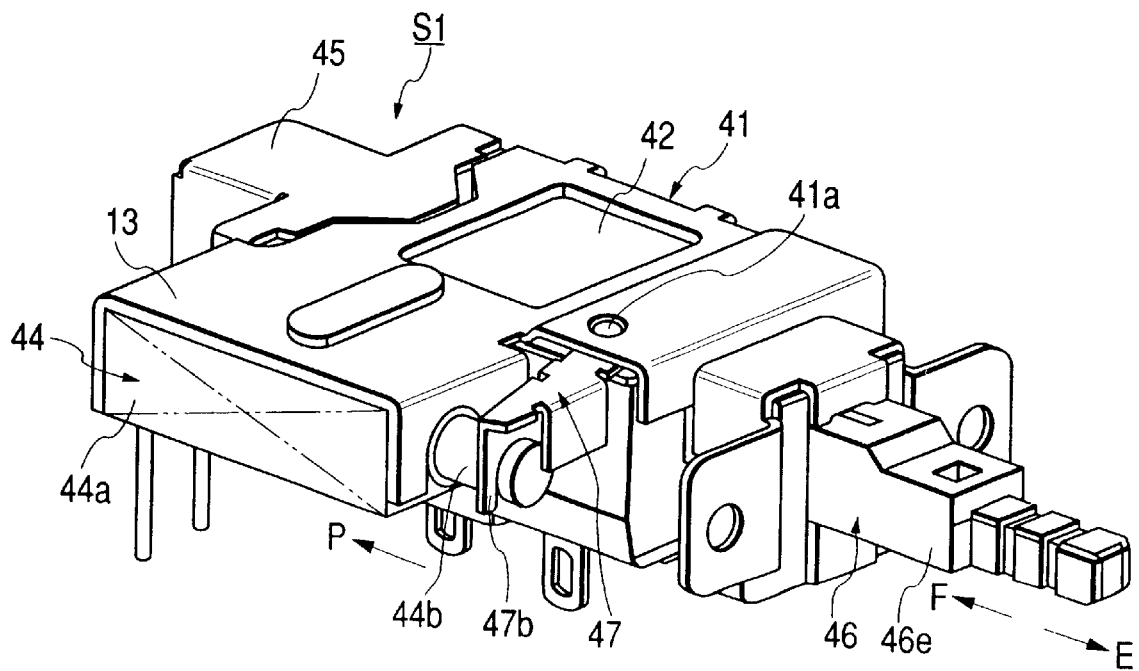
FIG. 2 is a perspective view showing a switch unit used in the electronic device.
Figure 3:
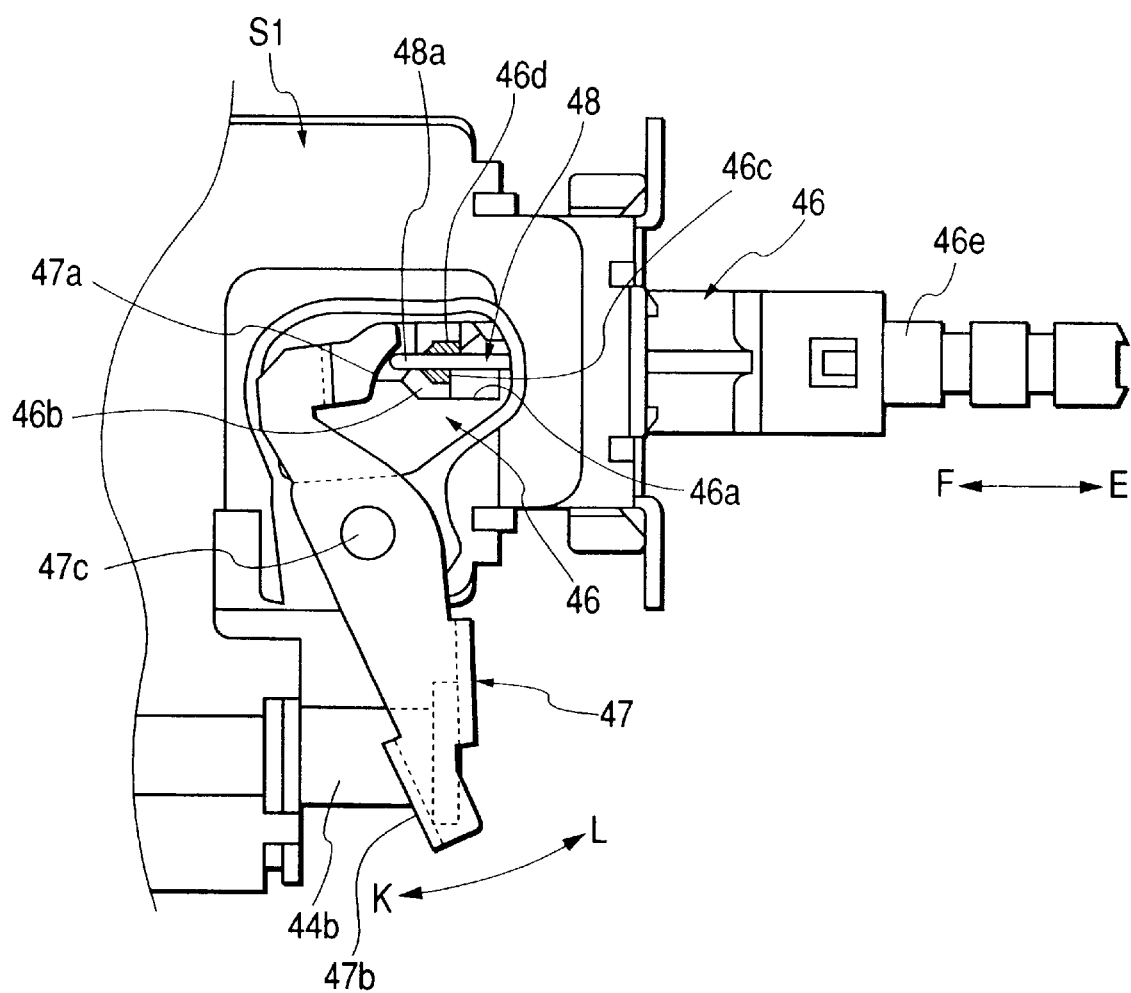
FIG. 3 is a plan view of principal portions explaining the operation of the switch unit.
Figure 4:
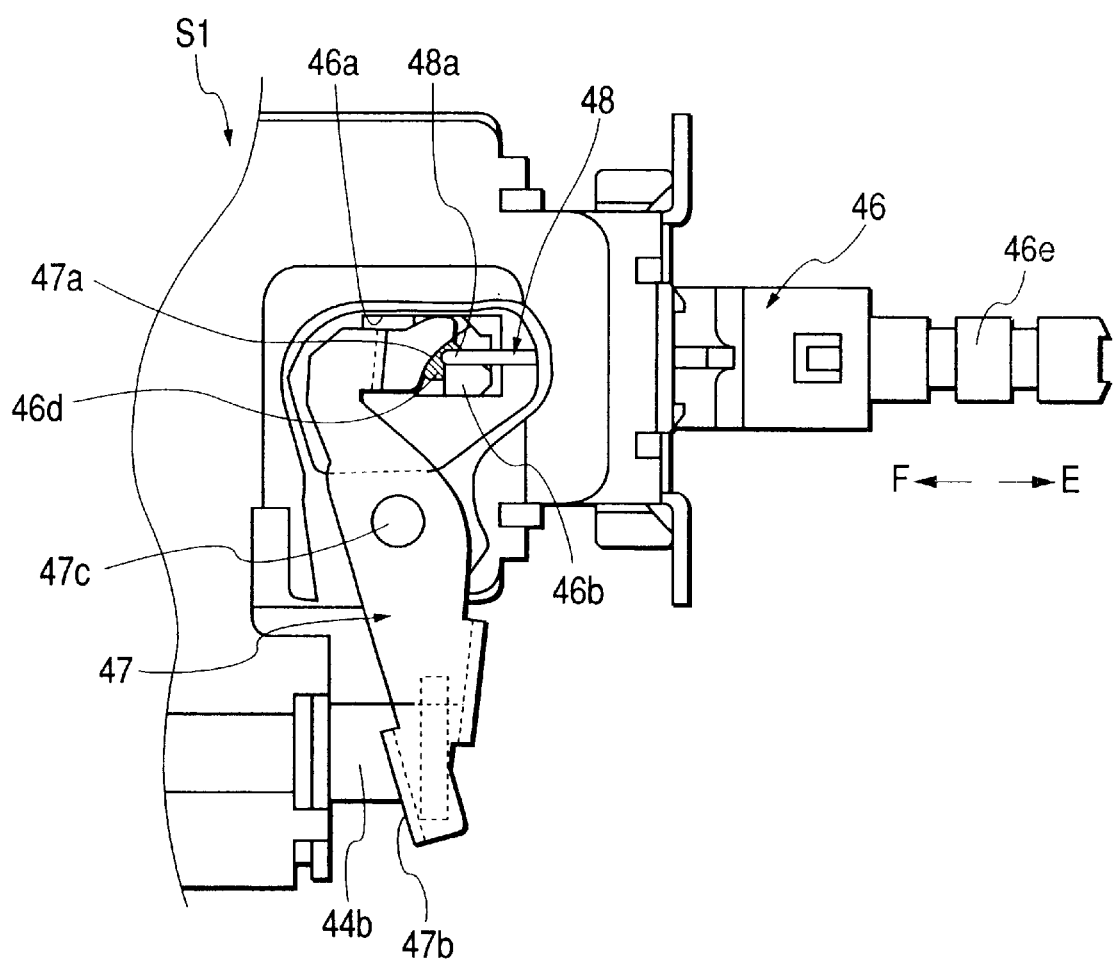
FIG. 4 is a plan view of principal portions explaining the operation of the switch unit.
Figure 5:
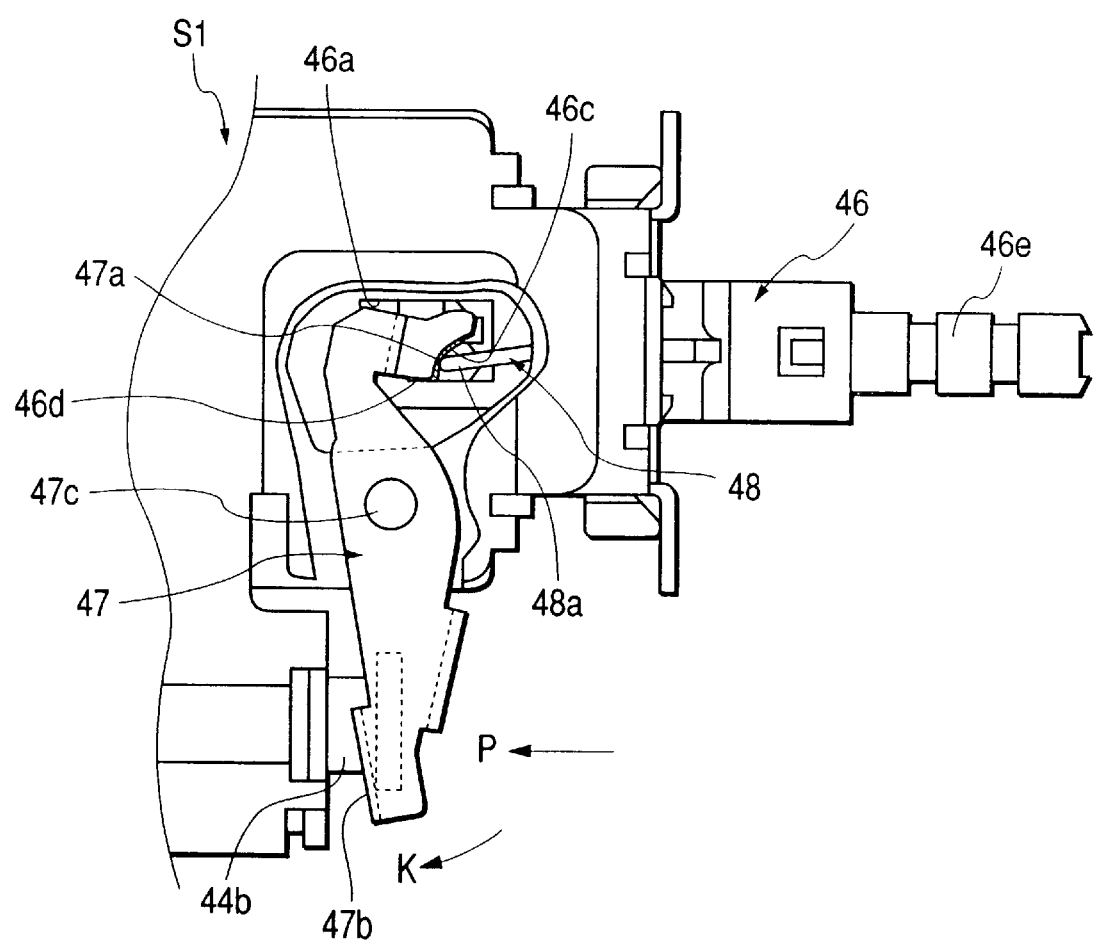
FIG. 5 is a plan view of principal portions explaining the operation of the switch unit.
Figure 6:
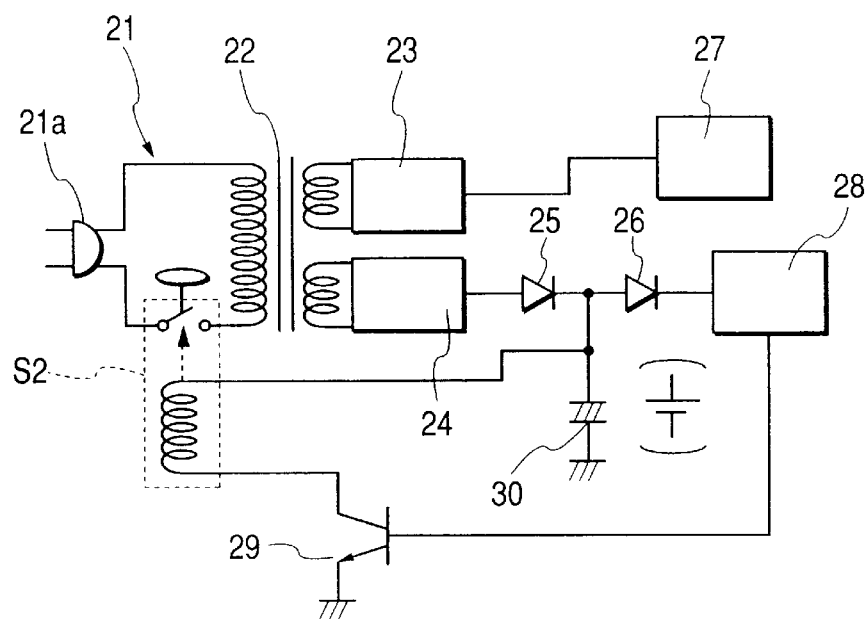
FIG. 6 is a circuit diagram of principal portions of a power control circuit used in an electronic device according to the present invention.
Figure 7:
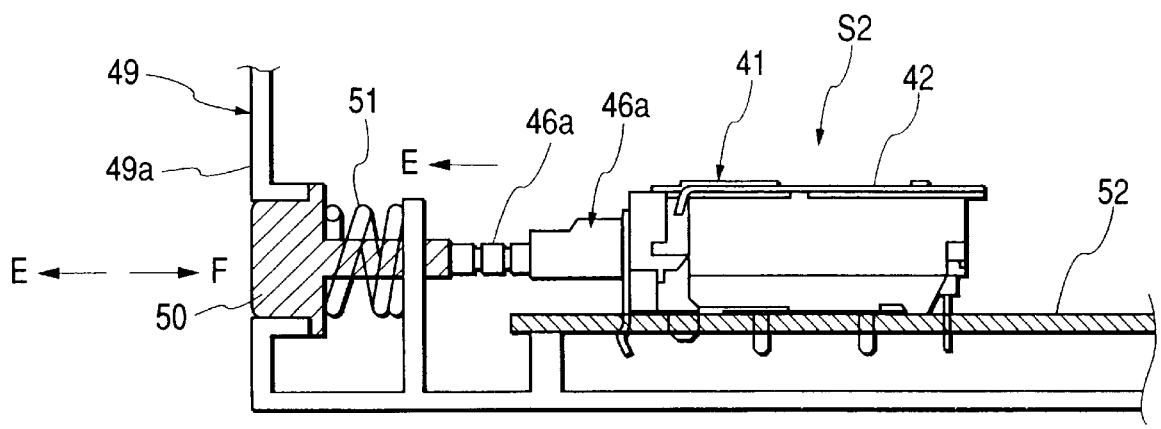
FIG. 7 is a schematic diagram explaining the operation of the electronic device.
Figure 8:
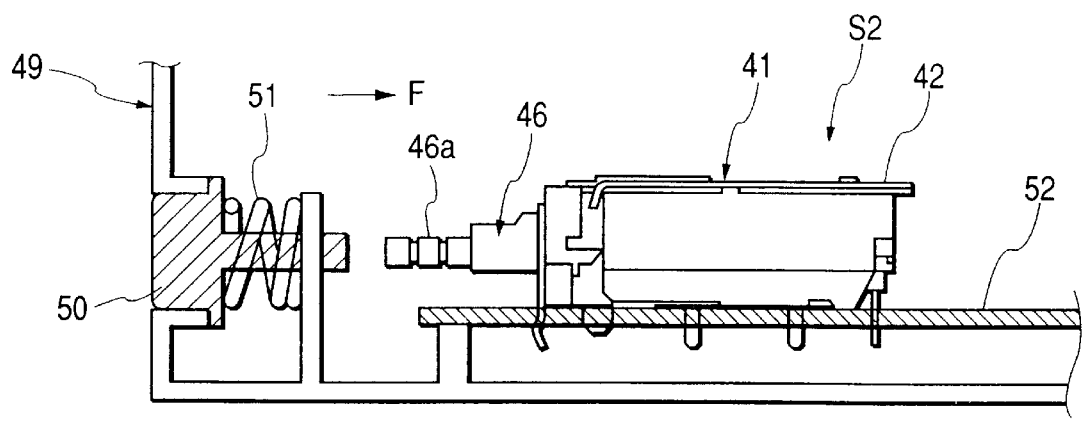
FIG. 8 is a schematic diagram explaining the operation of the electronic device.
Figure 9:
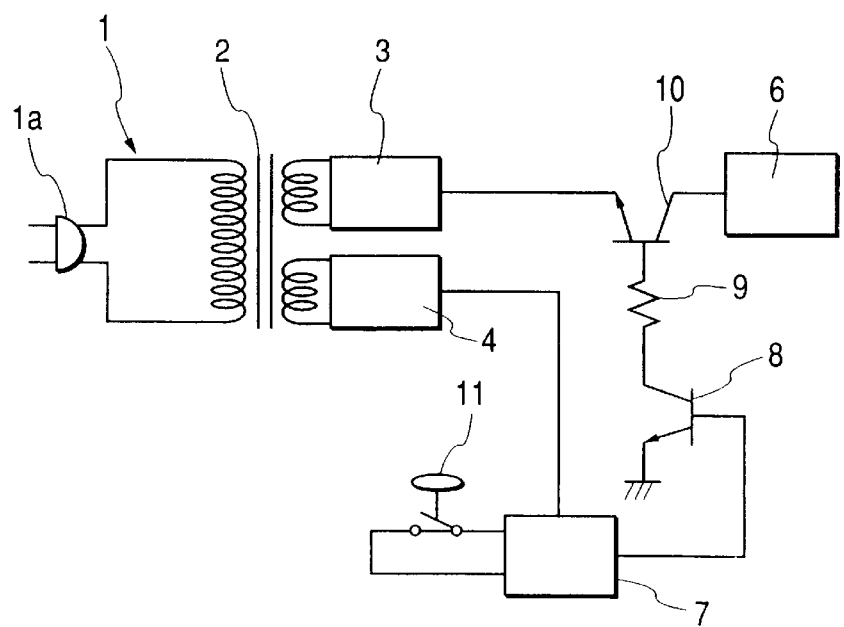
FIG. 9 is a circuit diagram of principal portions of a power control circuit used in a conventional electronic device.

Electronic devices having auto-OFF and auto-ON/OFF functions respectively according to embodiments of the present invention will be described hereinunder with reference to the accompanying drawings, in which FIG. 1 is a circuit diagram of principal portions of a power control circuit used in an electronic device embodying the present invention and having an auto-OFF function, FIG. 2 is a perspective view of a switch unit used in the circuit, FIGS. 3 to 5 are plan views of principal portions explaining operations of the switch unit, FIG. 6 is a circuit diagram of principal portions of a power control circuit used in an electronic device embodying the present invention and having an auto-ON/OFF function, and FIGS. 7 and 8 are schematic diagrams explaining operations of the electronic devices shown in FIG. 6.

First, an electronic device embodying the present invention and having an auto-OFF function will be described with reference to a power control system circuit used in a VTR for example. As shown in FIG. 1 which is a circuit diagram of principal portions, the power control system circuit comprises a primary power supply circuit 21 (hereinafter referred to as the "primary circuit 21") to which AC 100V is fed from a terminal 21a, a switch unit S1 disposed in and connected to the primary circuit 21 and having an auto-OFF function, and a secondary power supply circuit which comprises a signal and motor system power circuit 23 and a control system power circuit 24 and to which the electric power fed to the primary circuit 21 is fed through a power transformer 22.

The signal and motor system power circuit 23 is connected to a signal and motor system circuit 27, while the control system power circuit 24 is connected via reverse current preventing diodes 25 and 26 to a control system circuit 28 and the switch unit S1 to supply them with electric power. The control system circuit 28 and the switch unit S1 are connected together through a driving transistor 29. The power control system circuit used in the electronic device having an auto-OFF function according to the present invention is thus constructed schematically.

The switch unit S1 connected to the primary circuit 21 and having an auto-OFF function is constructed as in FIGS. 2 to 5. As shown in the same figures, in a frame 41, which is constituted of an iron plate or the like, there are formed an AC switch portion 42 with an AC switch (not shown) incorporated therein and a drive source portion 43.

A drive source 44 is attached o the drive source portion 43. The drive source 44, which is constituted of a solenoid for example, has a coil 44a and a plunger 44b. A drive member 47 to be described later can be operated by an attracting motion of the plunger 44b.

Behind the AC switch portion 42 is mounted a DC switch portion 45 with a DC switch (not shown) incorporated therein.

In the frame 41 is disposed an operating member 46 which can manually turn ON and OFF the switches incorporated in the AC switch portion 42 and the DC switch portion 45, respectively, (those interior switches will hereinafter be referred to as "switches"). An operating shaft 46e projecting outward, or rightward in the figure, from the frame 41 is integral with the operating member 46.

The operating member 46 is continually urged elastically in one direction indicated with arrow E by means of an elastic member (not shown) which is a coiled spring for example. With the operating shaft 46e located at the rightmost position in the figure, the switches in the switch unit S1 assume an initial OFF state.

When the operating member 46 is moved manually in the direction of arrow F from the initial state, the switches in the switch unit S1 turns ON.

Such a cam recess 46a as shown in FIG. 3 is formed at a predetermined depth in the operating member 46. At the bottom of the cam recess 46a is formed a cam bottom 46b which comprises plural flat faces of different depths and a slant face joining the flat faces.

Projecting nearly centrally of the cam bottom 46b is a heart cam portion (black portion) 46d having a locking wall 46c. The locking wall 46c is formed on the right-hand side in the figure of the heart cam portion 46d.

The frame 41 is formed with a projecting portion 41a shown in FIG. 2 and the drive member 47 is disposed in the ejecting portion 41a. As shown in FIG. 3, the drive member 47 is provided at an upper end portion thereof with a cam surface 47a formed by a combination of two slant faces of different angles and is also provided at a lower end portion thereof with an engaging portion 47b for engagement with a front end portion of the plunger 44b in the drive source 44.

The drive member 47 is nearly centrally formed with a hole 47c capable of being fitted on the projecting portion 41a of the frame 41. The hole 47c is fitted on the projecting portion 41a, whereby the drive member 47 is held rotatably by the frame 41.

A locking member 48 capable of locking the operating member 46 is constituted of a metallic rod both ends of which are bent at nearly right angles in the same direction. The locking member 48 has a locking portion 48a formed at one end thereof and a fulcrum (not shown) formed at the opposite end thereof.

As the operating member 46 reciprocates in the directions of arrows E and F, the tip of the locking portion 48a of the locking member 48, which is positioned on the cam bottom of the operating member 46, slides on the cam bottom 46b and can move pivotally around the heart cam portion 46d with the aforesaid fulcrum (not shown) as the center.

When the switches of the switch unit S1 are OFF in the initial state, as shown in FIG. 3, the operating member 46 is urged elastically in the direction of arrow E and the operating shaft 46e is in its rightmost position. At this time the operating member 46 is in an unlocked state.

In this state, the locking portion 48a of the locking member 48 is disengaged from the locking wall 46c of the heat cam portion 46d and is positioned on the cam bottom 46b, as shown in FIG. 3.

At this time, in the drive member 47, the locking member 48a on the cam bottom 46b and the cam surface 47a can move into contact with and away from each other because the drive source 44 is in a de-energized state.

When the operating member 46 is operated manually in the direction of arrow F from the above initial state, the locking portion 48a of the locking member 48 moves on the cam bottom 46b pivotally in the clockwise direction.

When the load which has been applied in the arrow F direction is removed after stop of the arrow F movement of the operating member 46 at a stopper portion (not shown), the operating member 46 moves back a little in the arrow E direction with a biasing force of an elastic member (not shown), so that, as shown in FIG. 4, the locking portion 48a is positioned on the locking wall 46c of the heart cam portion 46d and the operating member 46 is retained in its locked state, whereupon the switches of the switch unit S1 are turned ON.

Next, when the drive source 44 is operated to attract a plunger 5b in the direction of arrow P in FIG. 5, the drive member 47 pivotally moves clockwise in the direction of arrow K. As a result, the cam surface 47a moves rightward in the figure and presses the locking portion 48a which is in a locking state, so that the locking portion 48a moves downward in the figure on the locking wall 46c and becomes disengaged from the locking wall, thus causing the operating member 46 to be unlocked.

Then, the operating member 46 moves in the direction of arrow E by virtue of the elastic member (not shown) and reverts to its initial state automatically, whereby the switches of the switch unit S1 are turned auto-OFF.

Thus, in the switch unit S1, not only the locked state of the operating member 46 is released automatically by the drive member 47 which is operated by the drive source 44 and the switches are thereby turned auto-OFF, but also the switches can be turned OFF by manually operating the operating member 46.

The electronic device having an auto-OFF function according to the present invention is constructed so that the primary circuit 21 shown in FIG. 1 is turned ON and OFF by ON-OFF operation of the switch unit S1.

At the time when a user purchases the electronic device of the present invention, since the switch unit S1 in the primary circuit 21 is in its initial OFF state, the primary circuit 21 is not supplied with electric power even if the user inserts the terminal 21a into a plug receptacle (not shown).

For energizing the primary circuit 21, the user is required to manually operate the operating shaft 46e of the switch unit S1 to lock the operating member 46, whereby the switches of the switch unit S1 are turned ON and the primary circuit 21 can be completed.

Upon turning ON of the primary circuit 21, a DC power after conversion in the control system power circuit 24 is supplied to the secondary power supply circuit through the power transformer 22 and is then fed to the control system circuit 28 via the reverse current preventing diodes 25 and 26. Further, electric power is fed from the signal and motor system power circuit 23 to the signal and motor system circuit 27 through the power transformer 22 to turn ON the power supply of the electronic device having an auto-OFF function according to the present invention.

When the primary circuit 21 is energized and electric power is fed to the control system circuit 28, the control system circuit 28 makes an overall control for the whole of the electronic device. More specifically, the control circuit 28 detects various input operations performed by the user and performs various control operations such as controlling various components of the electronic device as necessary or starting an automatic picture recording in accordance with reserved timer recording contents data which have been reserved in a suitable storage area of memory (not shown).

With the power supply of the electronic device turned ON, if an OFF signal is inputted from the exterior by operation of a remote controller performed by the user or if a shift to the timer recording stand-by mode is instructed by an inputting operation, the control system circuit 28 detects it, the driving transistor 29 is turned ON, and the drive source 44 of the switch unit S1 operates to operate the drive member 47 automatically, thereby unlocking the operating member 46 which is in a locked state.

Then, the switches of the switch unit S1 are turned auto-OFF to cut off the supply of AC power to the primary circuit 21 automatically and at the same time the supply of electric power through the transformer 22 to the secondary power supply circuit comprising the signal and motor system power circuit 23 and the control system power circuit 24 is cut off.

Upon such interruption of the supply of electric power to the primary circuit 21, all of the supplies of electric power in the electronic device having an auto-OFF function according to the present invention are stopped and the consumption of electric power becomes nil, thus making it possible to eliminate such stand-by power consumption as in the prior art.

The following description is now provided about an electronic device embodying the present invention and having an auto-ON/OFF function, in which the primary circuit 21 can be energized automatically even in the case where the supply of electric power to the primary circuit 21 is cut off.

In the following point this electronic device having an auto-ON/OFF function is different from the previous electronic device having an auto-OFF function. As shown in FIG. 6, a switch unit S2 having an auto-ON/OFF function is connected to the primary circuit 21, and an electric power storage means 30 such as a capacitor or a secondary battery is disposed between the control system circuit 28 and the switch unit S2. With the supply of electric power to the primary circuit 21 interrupted, the operating member 46 is operated with the electric power supplied from the electric power storage means 30, thereby changing from one to the other circuit in the switch unit S2 and making it possible to also effect an auto-ON function.

First, the switch unit S2 having an auto-ON/OFF function will be described with respect to only such portions as are different from the switch unit S1 shown in FIGS. 3 to 5. The operating member 46 used in this electronic device has two, first and second drive sources capable of effecting operations in the directions of arrows E and F automatically. The operating member 46 can be operated not only automatically but also manually.

With the operating member operated in the arrow F direction and locked as in FIG. 4, both the switch in the AC switch portion 42 and the switch in the DC switch portion 45 are turned OFF, while when the operating member 46 has been operated in the arrow E direction and is unlocked, as in FIG. 3, the switches in the switch unit S2 are both turned ON. Thus, the ON/OFF operations of the switches relative to the operating directions of the operating member 46 are reverse to those in the previous first embodiment.

For operating the operating member 46 from locked to unlocked state to turn ON the switches of the switch unit S2, the locking member 48 can be moved downward from the locking wall 46c out of its locked state into unlocked state by utilizing the attractive force of the drive source 44 which is constituted of a solenoid for example, as described in the previous first embodiment.

For operating the operating member 46 from unlocked to locked state to turn OFF the switches of the switch unit S2, the operating member 46 shown in FIG. 3 is operated in the arrow F direction against the biasing force of an elastic member (not shown) with use of a second drive source (not shown) which is a stepping motor for example, thereby causing the locking member 46 to move pivotally into abutment against the locking wall 46c of the locking member 48 to lock the operating member 46.

When the switches of the switch unit S2 is turned ON and electric power is fed to the primary circuit 21, most of the electric power fed through the power transformer 22 to the secondary power supply circuit comprising the signal and motor system power circuit 23 and the control system power circuit 24 is fed from the signal and motor system power circuit 23 to the signal and motor system circuit 27. But a portion of the electric power fed to the secondary power supply circuit is fed from the control system power circuit 24 to the control system circuit 28 via the reverse current preventing diodes 25 and 26.

At this time, the electric power fed from the control system power circuit 24 is also fed to the electric power storage means 30 connected between the control system circuit 28 and the switch unit so that the electric power storage means is always charged to a voltage above a predetermined value.

Even when the switches of the switch unit S2 are OFF to stop the supply of electric power to the primary circuit 21 and the secondary power supply circuit, the control system circuit 28 is continually supplied with electric power from the electric power storage means 30 and therefore can detect a signal provided from the exterior such as a signal from a remote controller or a signal from a timer.

In the electronic device having an auto ON/OFF function according to the present invention, when the control system circuit 28 detects an ON signal from an external remote controller or the like or an ON signal from an external timer or the like, with the primary circuit 21 OFF and with the operating member 46 in the switch unit S2 locked, the control system circuit 28, which is supplied with electric power from the electric power storage means 30, sets the first drive source 44 in the switch unit S2 to work through the driving transistor 29, thereby operating the operating member 46 from locked to unlocked state. As a result, the switches in the switch unit S2 are turned ON and electric power is fed to the primary circuit 21.

Since the first drive source 44 is constituted of a solenoid and the power consumed at the time of turning ON the first drive source 44 is small, the first drive source 44 can be set to work sufficiently with a small electric power fed from the electric power storage means 30.

Then, electric power is fed to various components from the signal and motor system power circuit 23 and the control system power circuit 24 in the secondary power supply circuit through the power transformer 22, and the power supply of the electronic device turns ON. According to the control system circuit 28, it is possible to start recording in a reserved recording time zone, or operations of various portions such as rewinding or fast forward of video tape can be done by user's operation of a remote controller or the like from the exterior.

At this time, the electric power storage means 30 is charged with a predetermined amount of electric power supplied from the control system power circuit 24.

When the control system circuit 28 detects an OFF signal from an external remote controller or the like or an OFF signal from an external timer or the like, with the primary circuit 21 turned ON and the operating member 46 in the switch unit S2 unlocked, the control system circuit 28 causes the second drive source (not shown) in the switch circuit S2 to turn ON through the driving transistor 29, thereby operating the operating member 46 from unlocked to locked state.

As a result, the switches in the switch unit S2 are turned OFF and the electric power fed to the primary circuit 21 is cut off.

In this way the power supply of the electronic device having an auto-ON/OFF function according to the present invention turns OFF and the stand-by electric power in the primary circuit 21 can be made zero.

In this case, a relatively large electric power is needed for turning ON the second drive source, but the second drive source can be set to work relatively easily because it is the electric power fed to the primary circuit 21 that is used.

At the same time, the supply of electric power to the control system circuit 28 is switched over to the supply of electric power from the electric power storage means 30 which has been charged in advance, and the control system circuit 28 continues to operate. The electric power which the control system circuit 28 requires while the primary circuit 21 is OFF is so small that the electric power charged in the electric power storage means 30 will do.

When the control system circuit 28 detects that the output voltage of the electric power storage means 30 has dropped to a value below the predetermined value, the control system circuit 28 causes the driving transistor 29 to turn ON, allowing the switches of the switch unit S2 to turn ON automatically, whereby the primary circuit 21 is energized to charge the electric power storage means 30.

Thus, the occurrence of a trouble caused by a voltage drop of the electric power storage means 30 can be avoided.

Although in the electronic device having an auto-ON/OFF function according to the present invention both first and second drive sources were used for operating the operating member 46 in the switch unit S2, there may be used a single drive source for operation of the operating member 46.

As shown in FIGS. 7 and 8, the electronic device having an auto-ON/OFF function according to the present invention is provided with an operating button 50 in an operating surface 49a of a chassis 49, the operating button 50 being movable in the directions of arrows E and F. and is also provided with a spring 51 which urges the operating button 50 toward the operating surface 49a in the arrow E direction at all times. In the interior of the chassis 49, the switch unit S2 is mounted on a printed circuit board 52 on the side opposite to the operating button 50.

In the electronic device being considered, when the switch unit S2 shown in FIG. 7 is ON and with the operating member 46 unlocked by arrow E movement of an operating shaft 46a, and also when the switch unit S2 is OFF and with the operating member 46 locked by arrow F movement of the operating shaft 46a, the amount of projection of the operating button 50 from the operating surface 49 is constant.

That is, since the position of the operating button 50 is constant irrespective of ON-OFF of the switch unit 2, there occurs no incongruity sense in appearance.

For discriminating whether the power supply is ON or OFF from the exterior in the electronic device of this second embodiment, the operating button 50 may be illuminated or a lamp for ON-OFF discrimination may be dispose near the operating button 50.

As set forth above, in the electronic device having an auto-OFF function according to the present invention, a switch unit is disposed in the primary power supply circuit, a drive source is operated with a signal provided from the control system circuit, or the switches of the switch unit are turned OFF by manual operation of the operating member, and the supply of electric power to the primary power supply circuit can be cut off either automatically or manually. Therefore, the primary power supply circuit can normally be turned auto-OFF automatically to make the stand-by electric power zero. Besides, if a trouble such as runaway should occur in the control system circuit, resulting in the same circuit becoming uncontrollable, while electric power is fed to the primary power supply circuit, it is possible to cut off the primary power supply circuit manually and the work of pulling out the terminal from the plug receptacle is no longer required. Thus, there accrues an advantage in point of operability. Moreover, the foregoing switches are turned ON when the operating member of the switch unit are in a locked state and are turned OFF when the operating member is in an unlocked state. The operating member can be operated from locked to unlocked state not only automatically but also manually. Therefore, in the event a trouble such as runaway should occur in the control system circuit, resulting in the same circuit becoming uncontrollable, the switches can surely be turned OFF by manual operation of the operating member, thus affording a highly safe electronic device.

The switch unit is disposed in the primary power supply circuit and is provided with a drive source which can operate the operating member automatically. The drive source is operated with a signal provided from the control system circuit or with electric power fed from the electric power storage means, thereby causing the switches of the switch unit to turn auto-ON/OFF and making an automatic operation possible for both supply and cut-off of electric power for the primary power supply circuit.

Since it is also made possible to turn the switches ON and OFF by manual operation of the operating member and thereby manually supply and cut off electric power for the primary power supply circuit, the supply and cut-off of electric power for the primary power supply circuit can be done any time in accordance with a signal provided from the control system circuit and it is possible to make the stand-by electric power zero while the electronic device is not in use.

Further, in the event of occurrence such as runaway in the control system circuit, resulting in the same circuit becoming uncontrollable, the primary power supply circuit can surely be cut off by manual operation of the operating member, thus ensuring a high safety.

Additionally, the operating member in the switch unit can be operated to both locked and unlocked states automatically or manually, the switches are turned OFF when the operating member is locked and are turned ON when the operating member is unlocked and when the primary power supply circuit in an energized state is to be de-energized automatically, the drive source is set to work with a signal provided from the control system circuit to shift the operating member from unlocked to locked state automatically, while when the primary power supply circuit in a de-energized state is to be energized automatically, the drive source is set to work with electric power fed from the electric power storage means to shift the operating member from locked to unlocked state Thus, when operating the operating member from unlocked to locked state which operation requires a large driving force than in the unlocking operation, it is possible to use the electric power fed to the primary power supply circuit.

Therefore, by using a motor or the like having a large driving force as the drive source for shifting the operating member from unlocked to locked state, it is possible to provide an electronic device capable of turning auto-ON/OFF positively.

What is claimed is:

1. An electronic device having an auto-OFF function and comprising;

a primary power supply circuit;

a secondary power supply circuit which is supplied with electric power from said primary power supply circuit;

a control system circuit connected to said secondary power supply circuit; and a switch unit connected to said control system circuit and said secondary power supply circuit, said switch unit having a switch and an operating member which can operate said switch ON and OFF manually and OFF automatically, said switch unit being connected to said primary power supply circuit so as to control the supply of electric power to the primary power circuit, said switch unit having a drive source which can operate said operating member automatically to cause said switch to turn auto-OFF, wherein said operating member in said switch unit is operated manually to turn said switch ON to permit the supply of electric power to said power supply circuit, said operating member being in a locked position when said switch is ON, wherein said operating member is operated manually to turn said switch OFF to manually cut off the supply of electric power to said primary power supply circuit, said operating member being in an unlocked position when said switch is OFF, said operating member being moved from the locked position to the unlocked position by the manual operation of the operating member, and wherein said operating member is operated automatically in accordance with a signal provided from said control system circuit to operate said drive source to turn said switch auto-OFF to automatically cut off the supply of electric power to said primary power supply circuit, said operating member being in an unlocked position when said switch is auto-OFF, said operating member being moved from the locked position to the unlocked position by the automatic operation of the drive source on the operating member.

2. An electronic device having an auto-OFF function according to claim 1, wherein said operating member comprises a heart-shaped cam having a locking wall, and said switch unit comprises a locking member having a locking portion and a fulcrum portion, said locking portion being slidable along the cam of said heart cam by using its fulcrum portion as a fulcrum, said locking portion being locked against the locking wall when said operating member is in the locked position.

3. An electronic device having an auto-OFF function according to claim 2, wherein said drive source comprises a solenoid and a drive member, said solenoid being operable to move said drive member so as to move said locking portion off of said locking wall to turn said switch auto-OFF.

4. An electronic device having an auto-ON/OFF function and comprising:

a primary power supply circus;

a secondary power supply circuit which is supplied with electric power from said primary power supply circuit, a control system circuit connected to said secondary power supply circuit;

a switch unit connected to said control system circuit and said secondary power supply circuit, said switch unit having a switch and an operating member which can operate said switch ON and OFF manually and automatically; and an electric power storage means connected between said control system circuit and said switch unit, said switch unit being disposed in said primary power supply circuit so as to control the supply of electric power to the primary power circuit and having a drive source which can operate said operating member automatically, wherein said operating member in said switch unit can be operated to a locked state and an unlocked state automatically or manually, said switch is turned OFF when said operating member is in the locked state and is turned ON when the operating member is in the unlocked state, wherein for automatically opening said primary power supply circuit in an energized state, said drive source is operated with a signal provided from said control system circuit to operate said operating member automatically from the unlocked state to the locked state, while for automatically closing the primary power supply circuit in a de-energized state, the drive source is operated by the supply of electric power thereto from said electric power storage means to operate said operating member from the locked state to the unlocked state, wherein said drive source can be operated by a signal provided from said control system circuit to operate said operating member to automatically turn said switch auto-ON to permit the supply of electric power to said primary power supply, wherein said drive source can be operated with electric power fed from said electric power storage means to operate said operating member to automatically turn said switch auto-OFF to cut-off the supply of electric power to the primary power supply circuit, and wherein said operating member can be operated manually to turn the switch ON and OFF manually.

5. An electronic device having an auto-ON/OFF function according to claim 3, wherein said operating member comprises a heart-shaped cam having a locking wall, and said switch unit comprises a locking member having a locking portion and a fulcrum portion, said locking portion being slidable along the cam of said heart cam by using its fulcrum portion as a fulcrum, said locking portion being locked against the locking wall when said operating member is in the locked position.

6. An electronic device having an auto-ON/OFF function according to claim 5, wherein said drive source comprises a solenoid and a drive member, said solenoid being operable to move said drive member so as to move said locking portion off of said locking wall to turn said switch auto-ON.

7. An electronic device having an auto-ON/OFF function according to claim 3, further comprising an operating button disposed on an operating surface so as to project and retract therefrom and capable of operating said operating member of said switch unit, and urging means for urging said operating button so that the amount of projection of said operating button from the operating surface is constant when not being operated.

* * * * *

UNITED STATES PATENT AND TRADEMARK OFFICE
CERTIFICATE OF CORRECTION

PATENT NO. : 6,304,008 B1
DATED : October 16, 2001
INVENTOR(S) : Yoshimi Goto et al.

It is certified that error appears in the above-identified patent and that said Letters Patent is hereby corrected as shown below:

<u>Claim 4,</u>
Line 3, delete "circus;" and subsitute -- circuit; -- in its place.

Signed and Sealed this

Ninth Day of April, 2002

*Attest:*

*Attesting Officer*

JAMES E. ROGAN
*Director of the United States Patent and Trademark Office*